3,240,740
AQUEOUS DISPERSIONS OF SELF-CROSS-
LINKING COPOLYMERS
Karl-Heinrich Knapp and Wilhelm Berlenbach, Leverkusen, and Karl Dinges, Cologne-Stammheim, Germany, assignors to Farbenfabriken Bayer Aktiengesellschaft, Leverkusen, Germany, a German corporation
No Drawing. Filed May 3, 1960, Ser. No. 26,424
Claims priority, application Germany, June 24, 1959,
F 28,775
15 Claims. (Cl. 260—29.6)

The present invention relates to aqueous dispersions of self-cross-linking copolymers and to the use of such dispersions for producing shaped structures, especially for printing, padding and impregnating textiles and other fibre substrates.

It is known to produce aqueous dispersions of self-cross-linking linear copolymers by copolymerizing in aqueous emulsion acrylic or methacrylic acid amides, the amide groups of which are substituted by self-cross-linking groups, with other olefinically unsaturated monomers. Such derivatives of acrylic and methacrylic acid amides are, for instance, the N-methylol ether derivatives as well as the Mannich bases of the cited compounds. (By the term "self-cross-linking groups" there are to be understood such groups which under the influence of heat and/or acid catalysts effect cross-linkage of the copolymers.)

The aqueous dispersions of these copolymers do not satisfy all requirements of the practice with respect to their stability. It has been noticed, for instance, that temporary partial drying of these dispersions—especially under simultaneous mechanical stress—leads to the formation of coagulates. This disadvantage becomes apparent from unsatisfactory spreading properties in producing coatings or impregnations from said dispersions.

It has now been found that the aforesaid difficulty is overcome with the aid of aqueous dispersions of copolymers having incorporated therein (1) 0.5–10 percent by weight of at an olefinically unsaturated monomer with at least one hydrophilic group, especially an acid, hydroxy, amide or polyglycol ether group, (2) 0.5–15 percent by weight of a methylol ether and/or a Mannich base of acrylic or methacrylic acid amide, and (3) at least one further olefinically unsaturated monomer which is capable of copolymerizing with said monomers, the emulsifying agents of which aqueous dispersions consist essentially of non-ionic emulsifying agents.

The aqueous dispersions of the present invention are obtained by copolymerizing the cited monomers in an aqueous dispersion with the use of emulsifiers of a non-ionic type, preferably at a pH value below 7 and at a temperature below 60° C., and adjusting the resultant dispersions to a pH value of about 6.5 to 9. As monomers (1) there may also be used those olefinically unsaturated compounds into which the hydrophilic groups are introduced after copolymerization only, for example by saponification.

Suitable olefinic monomers with hydrophilic groups are, for example (a) α,β-olefinically unsaturated carboxylic acids such as acrylic acid, methacrylic acid, maleic acid, semi-esters of maleic acid with saturated aliphatic or cycloaliphatic alcohols having 1 to 10 carbon atoms, (b) mono-esters of α,β-olefinically unsaturated monocarboxylic acids, such as acrylic or methacrylic acids, with polyhydric alcohols such as glycol, trimethylol propane, glycerol, pentaerythrite, sorbitol, saccharose or of monoethers of mono-olefinically unsaturated monohydric alcohols such as allyl alcohol with the aforesaid polyhydric alcohols, (c) α,β-olefinicaly unsaturated carboxylic acid amides such as acrylic or methacrylic acid amide, (d) olefinically unsaturated polymerizable sulphonic acids such as vinyl sulphonic acid, and styrene sulphonic acid, (e) olefinically unsaturated polymerizable compounds having polyglycol ether groups such as acrylic or methacrylic acid polyglycol ether esters, or allyl polyglycol ethers of the formulae:

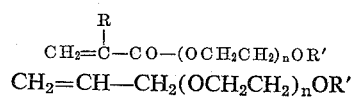

$$CH_2=CH-CH_2(OCH_2CH_2)_nOR'$$

in which R stands for H or $CH_3$, R' for H or alkyl having 1–10 carbon atoms, $n=2-20$ in case that R' stands for H and $n=4-20$ in case that R' stands for alkyl.

As olefinically unsaturated compounds containing hydrophilic groups after saponification there may be mentioned vinyl esters, especially vinyl acetate and vinyl propionate, furthermore maleic acid anhydride.

As methylol ethers of the acrylic or methacrylic acid there come into consideration compounds of the general formula:

(1) 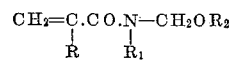

in which R stands for hydrogen or methyl, $R_1$ stands for hydrogen, alkyl, aralkyl or aryl, $R_2$ stands for alkyl or cycloalkyl, as for instance methyl, ethyl, n-propyl, isopropyl, n-butyl, isobutyl, and cyclohexyl, the alkyl methylol ethers of methacrylic acid amide being of special interest.

The Mannich bases of acrylic acid or methacrylic acid amide may be illustrated by way of example by the following general formula:

(2) 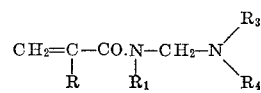

in which R and $R_1$ have the same meaning as in Formula 1, while $R_3$ and $R_4$ stand for alkyl, cycloalkyl, aryl and aralkyl, or $R_3$ and $R_4$ together stand for a heterocyclic radical, as for instance the morpholin radical. Suitable compounds of this type are disclosed in copending U.S. patent application Serial No. 851,971, filed November 11, 1959, and Belgian Patent 584,600.

As monomers which are copolymerized with the aforesaid monomers, the following compounds are suitable, for example: esters of acrylic or methacrylic acid with saturated monohydric aliphatic or cycloaliphatic alcohols containing 1 to 20 carbon atoms, acrylonitrile and methacrylonitrile, aromatic vinyl compounds such as styrene and styrene derivatives (vinyl toluene, nuclearly halogenated styrenes), vinyl chloride, vinylidene chloride, vinyl esters as for instance vinyl acetate, vinyl propionate, monovinyl ethers, and conjugated diolefines with 4 to 6 carbon atoms such as butadiene, chloroprene, isoprene. Furthermore, cross-linking monomers containing several unsaturated olefine groups in quantities of about 0.01 to 10 percent, referred to the weight of the total of monomers used, may also be employed such as glycol diacrylates, glycol dimethacrylates, acrylic acid and/or methacrylic acid allyl esters, divinyl benzene or substitution products of the aforesaid compounds. The selection of these monomers depends upon the desired properties of the copolymers. In general, one or more elasticity-imparting monomers such as conjugated diolefines or acrylic esters, are combined with one or more reinforcing monomers such as styrene, acrylonitrile or vinyl chloride.

Suitable emulsifiers of non-ionic character are the known reaction products of ethylene oxide with long-chain fatty alcohols, fatty acids, fatty acid amides containing 8 to 20 carbon atoms, or with aromatic hydroxy compounds, the reaction products with more than 4, for example 8 to 50 ethylene oxide units being preferably applied. There may be mentioned for example: hydroxyethylated tridecyl alcohol, stearyl alcohol or oleyl alcohol with about 20 ethylene oxide units, hydroxyethylated lauric, palmitic, stearic or oleic acid with about 10 to 20 ethylene oxide units, hydroxyethylated p-octyl phenol, nonyl phenol, dodecyl phenol, hydroxyethylated abiethyl alcohol with 10 to 30 ethylene oxide units, the hydroxyethylated products according to German Patent 824,949, hydroxyethylated lauryl, palmityl, oleyl, or stearyl amide with 5 to 20 ethylene oxide units. Further suitable non-ionic emulsifiers are the esters of long-chain monocarboxylic acids with 8 to 20 carbon atoms and sugars, as for example saccharose monolaurate, -mono- or distearate. These emulsifiers are generally used in amounts of 2 to 15 percent by weight, as calculated on the monomers applied. For carrying through the process of the present invention there may be used ion-active emulsifiers, especially anionic emulsifiers in addition to said non-ionic emulsifiers. However, the amount of such ion-active emulsifiers should in general not exceed 0.5 percent, calculated on the weight of the monomer used. As ion-active emulsifiers there come into consideration alkyl sulphates, alkyl sulphonates or addition products of sulphuric acid of long-chain olefines.

When using acrylic acid or methacrylic acid as a copolymerization component, it is necessary to effect the polymerization according to the present process at pH values below 7. It has been found that the aforesaid monomers may be copolymerized at pH values of 2 to 7, especially 3 to 6, without cross-linking the resultant copolymers. This result is surprising since it is known that the methylol ethers or Mannich bases of acrylic or methacrylic amide used for the production of the present copolymers have the tendency to cross-link in an acid medium so that the production of copolymers with the use of the aforementioned monomers has hitherto been effected in a neutral or weakly alkaline medium. It has further been found advantageous to carry out the copolymerization at temperatures below 60° C. with the use of known redox catalysts such as combinations of persulphates and pyrosulphites or bisulphites. Furthermore, the copolymer dispersions obtained are preferably rendered neutral or weakly alkaline in order to attain a permanent storage stability of the dispersions. For this purpose, pH values of about 6.5 to 9 have been found to be specially suitable.

The dispersions obtained according to the present process are distinguished by an especially high stability. The stability of these emulsions is so high that the dispersions do not coagulate upon drying under mechanical stress, but, in the non-completely dry state before the formation of a film they may again be stirred with water to give a dispersion. The present dispersions show, in addition to the aforesaid property of re-emulsifiability a very good stability to freezing and to electrolytes. Thus, for example, neither upon cooling to —20° C. nor by the addition of a 20 percent calcium chloride solution does coagulation take place. Their compatibility with fillers, pigments and other additives is also outstanding.

In this respect, the present dispersions differ advantageously from dispersions of copolymers which contain no hydrophilic monomers in addition to the aforesaid self-cross-linking monomers, and are produced with the use of chiefly ionic emulsifiers.

The copolymers of the dispersions described above contain reactive methylol ether or tertiary amino-methylene groups which are split at elevated temperatures and/or by the action of acid catalysts and simultaneously bring about a self-cross-linking of the copolymers with the formation of insoluble cross-linked products. On account of their property to form insoluble cross-linked products under mild conditions, the aforementioned polymers and copolymers may be used for the production of any shaped articles, such as coatings, impregnations and bondings. The process may be carried out by adjusting the dispersions to an acid pH value, preferably to 2 to 5, with suitable acids or compounds having an acid action such as hydrochloric acid, sulphuric acid, phosphoric acid, acetic acid, trichloroacetic acid, ammonium chloride or acid phosphates, then applying the dispersions to a suitable substrate and evaporating the water at elevated temperatures, thus cross-linking the polymers. It is also possible to effect the cross-linking by the action of heat only, temperatures of about 80 to 200° C., preferably 100 to 150° C. having proved suitable.

Although it is possible in principle to use the re-emulsifiable and self-cross-linking copolymer dispersions described without additional cross-linking agents, it may be advantageous in some cases to add to the aforesaid copolymer dispersions the water-soluble condensation products of aldehydes, especially formaldehyde, with urea, melamine, dicyandiamide, phenols or alkylmethylol ether derivatives thereof respectively, in order to obtain additional cross-linkage of the shaped articles.

Furthermore, the present copolymer dispersions may be advantageously used for printing, padding or impregnating of textiles or other fibre substrates since especially good fastness to washing and rubbing of the impregnations, dyeings or prints are obtained.

There may be added to the dispersions the usual pigment dyestuffs, fillers and emulsifiers. As pigments there come into consideration inorganic and organic pigments, such as phthalocyanine dyes, azodyestuff pigments, metal oxide and carbon black. There may be added to the mixtures the usual thickening agents as, for instance, water-soluble thickening agents such as tragacanth, starch, cellulose ethers, natrium alginate, polyvinyl alcohol, polyacrylamide and polyacrylic acid salts. There may also be used emulsions of the type "oil in water," as, for instance benzine thickeners.

The printing pastes have outstanding travelling properties in machine and film printing. Even under prolonged stress no coagulation product is formed. Partially dry residues redissolve or re-disperse in the printing paste or may be removed with water provided not too much time has passed after drying. On the other hand, the cross-linked product cannot be redispersed in water to form a dispersion, the "re-emulsifiablity" being definitely limited to the partially dry state before final film formation.

In order to obtain condensation of the copolymers on the textiles the above-mentioned additives and processes may be used, whereby the copolymers after being applied to the textiles are subjected to elevated temperatures of about 80 to 200° C., preferably 100 to 150° C., if desired in an acid medium, condensation being effected within about 1 to 10 minutes. The above-mentioned condensation products of aldehydes, especially formaldehyde, with urea, melamine, dicyandiamide, phenols, or the respective alkyl methylol ethers, may be added to the dispersions used for treating the textiles.

In the following examples the parts are parts by weight.

*Example 1*

In a reaction vessel provided with stirrer and thermometer a solution of 30 parts of a reaction product of 13–15 mols of ethylene oxide and 1 mol of cetyl alcohol is mixed with 550 parts of water. About 1/10 of a monomer mixture of 300 parts of butyl acrylate, 165 parts of styrene, 20 parts of methylmethylol ether of methacrylamide and 0.25 parts of n-dodecylmercaptan and also about 1/10 of a solution of 32.5 parts of a 46% acrylic acid in 100 parts of water are added. When the air in the reaction vessel is replaced by nitrogen, the mixture is heated to 35° C. and the polymerization initiated by the addition of 3 parts of sodium pyrosulphite and 2 parts of potassium persulphate. The residual monomer mixture and the residual acrylic acid solution are continuously added in the course of about 3 hours through dropping funnels. The temperature is kept at 40–45° C. After about 1½ hours 1 part of sodium pyrosulphite and 0.5 part of potassium persulphate each dissolved in 25 cc. of water are again added. About 2 hours after the addition is completed, the polymerization is terminated and the yield of polymer is about 95% of the theoretical. The resultant, about 38% dispersion is adjusted to a pH value of 6–7 with ammonia or triethanolamine.

A few drops of the dispersion dried by rubbing on the palm may be stirred with water to give the same dispersion as before without any coagulation product being formed.

By modifying the present process in such a manner that, in addition to the afore-mentioned non-ionic emulsifier, 15 parts of the sodium salt of a long-chain alkyl-sulphonic acid or an addition product of sulphuric acid and a long-chain olefin (ampho soap) are used, a dispersion is obtained which, upon drying by rubbing on the palm forms a coagulation product which cannot be stirred with water. When the process described above is carried out without using acrylic acid, coagulation of the copolymer takes place before the polymerization is completed.

600 g. of petroleum (boiling range about 160–230° C.) are emulsified, using a rapid stirrer (2000 r.p.m.), in a mixture of 200 g. of the above dispersion with 177 g. of water,
3 g. of a reaction product of 1 mol of cetyl alcohol and 13–15 mols of ethylene oxide,
20 g. of a 50% ammonium nitrate or ammonium thiocyanate solution.

A viscous paste is formed which is mixed with 50 g. of a 40% dispersion of Helioechtblau BL in water (Schultz Farbstofftabellen, vol. I, 7th edition, No. 1188) and printed on cotton and spun rayon according to conventional methods in roller printing. An intense brilliant blue shade is obtained which, upon printing and heat-setting at 130–140° C. for 8–10 minutes, is fast to boiling, washing, rubbing and scrubbing.

To test the mechanical stability, this printing paste is treated for 30 minutes in a high-speed agitator (6000 r.p.m.) and subsequently filtered through a suction filter. No residues remain on the filter disc because no coagulation product is formed. The printing paste is thus stable to mechanical stress.

To test the redispersibility of the printing paste after drying, screen gauze is tentered and coated with the printing paste in about 0.2 centimeter thick layer. At a slightly elevated temperature (about 30° C.) the printing paste is allowed to dry for one hour. The dry printing paste is then removed with cold water with the aid of a soft brush, stirred in water and filtered. No residues remain on the filter.

*Example 2*

250 parts of the dispersion obtained according to Example 1 are mixed with
50 g. of a 6% carboxy-methyl cellulose (about 2000 cp.),
30 g. of dimethyl urea (obtained from 2 mols of formaldehyde and 1 mol of urea, pH 11, at room temperature in a concentrated aqueous solution),
550 g. of a 70% aqueous emulsion of heavy benzine containing 1% of a reaction product of 1 mol of cetyl alcohol and 15–20 mols of ethylene oxide as emulsifying agent,
20 g. of a 50% solution of ammonium nitrate, and
100 g. of a 40% dispersion of a yellow azo dyestuff obtained by coupling diazotized 4-chloro-2-nitraniline with aceto acetic-o-chloroanilide.

On cotton, spun rayon and other fabrics of semi-synthetic fibres this printing paste yields a brilliant yellow shade which, after heat-setting is distinguished by a soft handle and excellent fastness to washing and rubbing.

The test of the mechanical stability and redispersibility after drying up is carried out according to Example 1. Also in this case, no deposits are found which are not soluble in water.

*Example 3*

300 g. of a 50% aqueous dispersion of titanium dioxide (rutile type) and
10 g. of a 30% aqueous dispersion of copper phthalocyanine (Heliogenblau B) are stirred into
250 g. of the dispersion according to Example 1,
100 g. of a 50% solution of a water-soluble condensation product of formaldehyde and melamine,
10 g. of ammonium nitrate,
3 g. of ammonia
100 g. of a 15% aqueous solution of the polymeric methyl-methylol ether or acrylamide,
2 g. of the reaction product of 12 mols of ethylene oxide and 1 mol of hydroxy-diphenyl methane, and
225 g. of water.

With this paste very satisfactorily adhering subdued colour effects are obtained in machine printing on un-dyed and dyed textiles which, after a dry heat-setting at 140° C. for 5–7 minutes, are fast to washing, scrubbing and rubbing and have a pleasant soft handle.

The test of the mechanical stability and redispersibility of the printing paste after drying up is carried out according to Example 1. After this test no residues remain which proves that the paste is stable and redispersible.

*Example 4*

Into a vessel provided with stirrer a solution of 550 parts of water, 30 parts of a reaction product of 15–20 mols of ethylene oxide and 1 mol of o-hydroxy-diphenyl methane, and 5 parts of a condensation product of formaldehyde with naphthalene-sulphonic acid is introduced. A mixture of 345 parts of butyl acrylate, 125 parts of acrylonitrile, 12 parts of methylmethylol ether of methacrylamide and 0.25 part of n-dodecyl-mercaptan in addition to 32.5 parts of a 46% acrylic acid in 199 cc. of water is polymerized.

The resultant, approximately 38% dispersion is adjusted to a pH of 6–7 with ammonia or triethanolamine. This dispersion may also be stirred with water after being dried up by rubbing without any irreversible coagulation product being formed.

500 g. of heavy benzine are emulsified in a mixture of 280 g. of the above dispersion,
20 g. of a 25% solution of polyvinyl alcohol (500 cp.),
50 g. of a 1% aqueous solution of polymeric methylol-methacrylamide,
130 g. of water,
20 g. of a 50% ammonium nitrate solution and mixed with
80 g. of a 40% dispersion of chlorinated copper phthalocyanine (Heliogengruen B=4,4′,4″,4‴-tetraphenyl copper-phthalocyanine)

A viscous printing paste is obtained which is printed on cotton and spun rayon according to conventional processes. After heat setting (at 140° C. for 5 minutes), the print is fast to boiling, washing and rubbing as well as satisfactorily stable to perchlorethylene i.e. fast to dry cleaning.

The mechanical stability and redispersibility after drying up is tested as described in Example 1. No perceptible deposits are formed.

*Example 5*

600 g. of heavy benzine (boiling range 160–230° C.) are emulsified with a high speed stirrer (about 2000 r.p.m.) in the mixture of 100 g. of a dispersion according to Example 4 with
50 g. of a 4% aqueous solution of locust bean flour,
5 g. of a product of 1 mol of stearyl alcohol and 15–20 mols of ethylene oxide,
10 g. of a still water-soluble condensation product of 2 mols of formaldehyde and 1 mol of urea, 20 g. of a 50% solution of ammonium thiocyanate,
155 g. of water, and
60 g. of a 25% aqueous dispersion of carbon black.

According to the processes commonly applied in film and roller printing there is obtained on cotton, viscose rayon, polyamide and acetate rayon an intense black shade which, after heat-setting at 135–140° C. for 5–10 minutes, is fast to washing and rubbing. This print is highly stable to agents used for dry cleaning (chlorinated hydrocarbons).

*Example 6*

Into a 10-liter V$_2$A-lined autoclave provided with stirrer a solution of 180 parts of the reaction product of ethylene oxide and cetyl alcohol, 30 parts of a condensation product of formaldehyde and naphthalene-sulphonic acid, 50 parts of a 46% aqueous acrylic acid and 3850 parts of water is introduced. In this solution a mixture of 1350 parts of butadiene, 450 parts of butyl acrylate, 35 parts of acrylonitrile, 90 parts of methylmethylol ether of methacrylamide and 6 parts of tert.dodecylmercaptan is emulsified. After heating the mixture to 35° C., 15 parts of sodium pyrosulphite dissolved in 200 parts of water, and 15 parts of potassium persulphate dissolved in 200 parts of water are added. When about 33 and 66%, respectively, of the mixture have reacted, 40 parts of a 46% aqueous acrylic acid in 100 parts of water are injected in each case. The polymerization is completed after about 30 hours. The approximately 38% latex is adjusted to a pH of 6 to 7 with ammonia or triethanolamine. After the addition of an anti-oxidant unreacted monomers which may still be present are removed by stirring under reduced pressure.

100 g. of heavy benzine are emulsified in a mixture of
300 g. of the above dispersion with
100 g. of a 10% ammonium polyacrylate solution (500–2000 cp.),
30 g. of a 40% solution of the hexamethyl ether of hexamethylol melamine,
3 g. of a 24% ammonia,
7 g. of an ethoxylated oleyl alcohol,
90 g. of water, and
10 g. of ammonium thiocyanate.

The emulsion is then mixed with 360 g. of a 55% aqueous dispersion of titanium dioxide (rutile type).

A viscous paste is obtained which produces an intensely dyed cotton and viscose rayon in screen printing an opaque whitening effect which is fast to rubbing and washing after a hot-air treatment at about 130° C. for 10 minutes, and which is distinguished by a pleasant soft handle.

Testing of the mechanical stability and redispersibility after drying of the paste is carried out according to Example 1. No coagulation product is formed.

*Example 7*

100 g. of the dispersion according to Example 6 are mixed with
5 g. of an ethoxylated oleyl alcohol,
50 g. of a 100% ammonium polyacrylate solution,
25 g. of a 30% solution of diammonium phosphate,
195 g. of water, and
25 g. of a 40% dispersion of a crude azo dyestuff obtained by coupling diazotized 2,4,5-trichloroaniline with 2′,3′-hydroxynaphthoyl-2-methyl-1-aminobenzene
600 g. of a high boiling heavy benzine (boiling range 160–230° C.) are then emulsified in this mixture.

A paste is obtained which is printed by film printing on cotton and spun rayon and produces an intense brilliant scarlet shade which, after heat setting (at 150° C. for 2 minutes) is distinguished by a very soft handle and very good fastness to scrubbing, boiling, washing and rubbing.

*Example 8*

600 g. of heavy benzine are emulsified by means of a high-speed agitator in a mixture of 200 g. of the dispersion according to Example 1 containing in addition to the non-ionic emulsifier a further 15 parts of an anionic emulsifier,
10 g. of a reaction product of 1 mol of cetyl alcohol and 15–18 mols of ethylene oxide,
120 g. of water,
50 g. of an aqueous dispersion of Helioechtblau BL (40%).

Provided the emulsifying process is carried out for a brief period of time and at 1500 r.p.m., a sufficiently viscous paste is obtained which contains no agglomerate. Upon the addition of 20 g. of a 50% ammonium nitrate solution, it is ready for printing and yields on cotton and viscose rayon an intense brilliant blue shade which excels by exhibiting a soft handle and good fastness to scrubbing, boiling, washing and rubbing.

However, if stirring is carried out at a higher number of revolutions, about 3000 to 5000 r.p.m., the printing paste becomes non-homogeneous after only a few minutes. Large quantities of agglomerates are found in the printing paste which is no longer printable. Upon filtration large quantities of solids remain on the filter formed by coagulation of the synthetic dispersion of solids.

When the printing paste obtained with slight stirring is spread on a tentered screen gauze and allowed to dry up partially, it may be removed only incompletely with water since the dried dyestuffs of the dispersion cannot be redistributed with water even by vigorous stirring. By subsequent filtration, these solids remain on the filter. The same results is obtained by adding the printing paste hydroptropic substances such as urea and ethylene glycol, and protective colloids such as sodium alginate or carboxymethyl cellulose.

*Example 9*

In a solution of 12 parts of a condensation product of 15–20 mols of ethylene oxide and 1 mol of o-hydroxydiphenyl methane, 2 parts of a condensation product of formaldehyde and naphthalene-sulphonic acid, and 280 parts of water, a mixture of 124 parts of butyl acrylate, 50 parts of acrylonitrile, 20 parts of vinyl acetate and 6 parts of the methylmethylol ether of methacrylamide is emulsified. After replacing the air of the reaction vessel by nitrogen, the mixture is heated to 35° C. and the polymerization started by the addition of 1 g. of sodium pyrosulphite and 0.6 parts of potassium persulphate. After about 3 hours, the polymerization is completed and the polymer content amounts to 39%. The dispersion is at first not "re-dispersible." By the addition of ammonia or triethanolamine the pH value of the dispersion is adjusted to 8 and the mixture heated to 70–80° C. for about ½ hour whereby the polymerized vinyl acetate is saponified. The pH value thus decreases to 6–7 and the dispersion becomes "re-dispersible," i.e. upon drying by rubbing the polymer can be redispersed in water. If the present process is carried out without the use of acrylic acid, partial coagulation of the mixed polymer occurs already during polymerization.

The above "re-dispersible" emulsion is suitable as impregnating agent of fabrics and for the production of printing pastes.

*Example 10*

A solution of 25 parts of a reaction product of 1 mol of cetyl alcohol and 13–15 mols of ethylene oxide in addition to 2 parts of di-naphthalene-methane sulphonate (Na salt) in 600 parts of water is introduced into a reaction vessel equipped with stirrer and thermometer. About 1/10 of a mixture of 190 parts of butyl acrylate, 100 parts of ethyl acrylate, 165 parts of styrene, 20 parts of the methylmethylol ether of methacrylamide and 0.25 part of n-dodecylmercaptan are emulsified in this mixture. When the air in the reaction vessel is replaced by nitrogen and the emulsion heated to 35–40° C., the polymerization is started by the addition of 3 parts of sodium pyrosulphite and 2 parts of potassium persulphate. Through 2 dropping funnels there are now added within 2–3 hours (a) the residual monomer mixture and (b) a solution of 25 g. of acrylamide in 100 cc. of water within 2–3 hours. Another 1 part of sodium pyrosulphite and 0.5 part of potassium persulphate each dissolved in 25 parts of water are added in between.

The polymerization temperature is kept at 40–45° C. 1–2 hours after completion of the addition, the polymerization is practically completed. The resultant, about 38% dispersion is adjusted to a pH value of about 7 with ammonia. A few drops of the dispersion may be stirred with water after being dried by rubbing, without any formation of an irreversible coagulation product.

In a high-speed agitator (2000 r.p.m.)

600 g. of petroleum (boiling range 160–230° C.) are emulsified in
200 g. of the above dispersion,
177 g. of water,
3 g. of a reaction product of 1 mol of cetyl alcohol and 13–15 mols of ethylene oxide, and
20 g. of a 50% ammonia solution.

The viscous paste thus formed is mixed with 50 g. of a 40% aqueous dispersion of Helioechtblau BL (Schultz, Farbstofftabellen, vol. I, 7th edition, No. 1188), and printed on cotton or spun rayon by roller printing according to conventional methods. The intense brilliant blue shade is, after heat-setting at 130–140° C. for 8–10 minutes, fast to boiling, washing, rubbing and scrubbing.

The mechanical stability and redispersibility of the printing paste is tested as described in Example 1.

Example 11

In a ten liter autoclave provided with stirrer 1080 g. of butyl acrylate and 1500 g. of vinyl chloride are emulsified in a solution of 180 g. of an adduct of 1 mol of o-benzyl hydroxydiphenyl and 16 mols of ethylene oxide, 300 g. of acrylamide and 120 g. of methacrylamide-N-methylol methyl ether in 4.5 l. of water and copolymerized at 35 to 40° C. after addition of 18 g. of sodium metabisulphite and 12 g. of potassium persulphate, each dissolved in 250 cc. of water. After about 24 hours polymerization is terminated. The 37 percent latex is adjusted to a pH value of 6.5 with ammonia. It shows a very good mechanical stability. The latex after being partially dried for a short period can easily be redispersed with water.

Example 12

In a glass reaction vessel provided with stirrer, thermometer and reflux cooler 300 g. of acrylic acid butyl ester, 264 g. of vinylidene chloride and 18 g. of methacrylamide-N-methylol methyl ether are emulsified by thorough stirring in a solution of 36 g. of an adduct of 1 mol of stearyl alcohol and 20 mols of ethylene oxide in 700 cc. of water. After the addition of 40 g. of a solution of a 45 percent aqueous acrylic acid in 100 cc. of water polymerization sets in at about 30° C. after adding 3.6 g. of sodium pyrosulphite and 2.4 g. of potassium persulphate each dissolved in 50 cc. of water. After about 24 hours polymerization is terminated. The 38 percent latex is adjusted to a pH value of about 6.5 by means of ammonia and shows good redispersion properties.

Example 13

In a stirrer-type reaction vessel provided with thermometer and reflux cooler 300 g. of butyl acrylate and 150 g. of styrene are emulsified in a solution of 25 g. of hydroxyethylated o-benzyl hydroxydiphenyl, 20 g. of a Mannich compound from methacrylamide, formaldehyde and morpholine, and 30 g. of acrylamide in 650 cc. of water, and polymerized at 40 to 50° C. after addition of 2.5 g. of potassium persulphate and 1.5 g. of sodium pyrosulphite in 50 cc. of water respectively. Polymerization is terminated after about 16 hours. Thereafter, the latex is adjusted to a pH value of 6.5 by means of triethanolamine. There is obtained a latex which shows good redispersion properties.

Example 14

In the stirrer-type vessel described above a mixture of 275 g. of butyl acrylate, 155 g. of styrene, 50 g. of maleic acid monobutyl ester and 20 g. of methacrylic acid amide-N-methylol-butyl ether are emulsified in a solution of 25 g. of hydroxyethylated nonyl phenol in 650 cc. of water, and polymerized at 40 to 45° C. after addition of 2.5 g. of sodium pyrosulphite and 2.5 g. of potassium persulphate each dissolved in 50 cc. of water. After neutralizing the about 38 percent latex to a pH value of 7 by means of ammonia there is obtained a latex which shows good redispersion properties.

Example 15

In a stirrer-type vessel provided with thermometer, reflux cooler and two dropping funnels there is placed a solution of 30 g. of hydroxyethylated o-benzyl hydroxydiphenyl in 450 cc. of water. The first dropping funnel contains a mixture of 345 g. of butyl acrylate, 125 g. of acrylonitrile and 15 g. of methacrylamide-N-methylol butyl ether, the second contains a solution of 15 g. of vinyl sulphonic acid in 100 cc. of water. After the emulsifying solution has been heated to 40° C. 30 cc. of a solution of 4 g. of sodium pyrosulphite in 100 cc. of water and 30 cc. of a solution of 2.5 g. of potassium persulphate in 100 cc. of water are added, whereafter the contents of the dropping funnels are added dropwise within 2 hours. From time to time 10 to 20 cc. of the sodium pyrosulphite and potassium persulphate solutions are added. About two hours after the dropwise addition is terminated polymerization is complete. The latex which has been adjusted to a pH value of 6.5 by means of ammonia shows good redispersion properties.

Example 16

In a stirrer-type vessel provided with thermometer, reflux-cooler and one dropping funnel there is placed a solution of 50 g. of the reaction product of 1 mol of allyl alcohol with about 7 mols of ethylene oxide and 30 g. of o-benzyl hydroxydiphenyl polyglycol ether in 550 cc. of water. After the solution has been heated to 40° C., there are added respectively 30 cc. of a solution of 3 g. of sodium pyrosulphite in 100 cc. of water and 2 g. of potassium persulphate in 100 cc. of water. Immediately thereafter dropwise addition of a mixture of 300 g. of butyl acrylate, 75 g. of styrene, 60 g. of acrylonitrile and 15 g. of methacryl amide-N-methylol methyl ether is started which lasts two hours. Two hours after the dropwise addition has been finished, polymerization is terminated. The 37 percent latex is adjusted to a pH-value of 6.5 by means of ammonia. The latex shows good redispersion properties.

Example 17

According to the process described in Example 4 a latex is produced with the only variation that 30 parts of saccharose-monolaureate are used as emulsifier instead of 30 parts of hydroxyethylated o-hydroxydiphenyl methane. The latex obtained is adjusted to a pH value of 6.5 and after drying by rubbing in the palm and redispersing with water does not form an irreversible coagulate.

Example 18

In a polymerization vessel as described above which is provided with stirrer, thermometer and reflux-cooler in a solution of 15 g. of o-benzyl hydroxydiphenyl-polyglycol ether, 24 g. of methacrylic acid amide, 1.5 g. of dinaphthylmethane sulphonate in 450 cc. of water there is emulsified a mixture of 180 g. of acrylic acid butyl ester, 57 g. of styrene, 30 g. of acrylonitrile and 9 g. of methacrylic acid amide-N-methylol ethyl ether. Polymerization is started at 40° C. while adding 1.8 g. of sodium pyrosulphite and 1.2 g. of potassium persulphate. Polymerization is complete after about 10 hours. The latex which is adjusted to a pH value of 7 shows good redispersion properties.

The Mannich bases referred to above may be obtained by reacting acrylic or methacrylic amide with formaldehyde and secondary amines such as dimethyl-, diethyl-, dipropyl-, dibutyl-amine, methylbutylamine, N-methylaniline, N-ethylaniline, N-benzylaniline, morpholine, piperidine. In order to produce the Mannich bases, the formaldehyde may be added to a solution of the acrylic or methacrylic acid amide followed by the addition of the secondary amine. The formaldehyde may be added in the form of an aqueous solution or, when working in anhydrous medium, as paraformaldehyde. Preferably 1 mol of formaldehyde and 1 mol of secondary amine are employed per CO—NH group. The reaction proceeds exothermically and does not require the addition of a catalyst. After the main reaction subsides, it is preferable to complete the reaction by heating the reaction mixture to a temperature of from 50 to 100° C.

We claim:
1. A storage-stable aqueous dispersion of a copolymer of (1) 0.5–10% by weight of a monoethylenically unsaturated monomer having a hydrophilic group selected from the group consisting of carboxylic, hydroxy, amide, sulfonic acid, and polyglycol ether groups, (2) 0.5–15% by weight of a monomer of the formula:

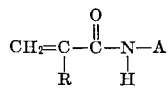

in which R stands for a member selected from the group consisting of hydrogen and methyl, and A stands for a radical having one of the formulae selected from the group consisting of:

and

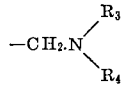

wherein $R_2$ stands for a member selected from the group consisting of alkyl and cycloalkyl; and $R_3$ and $R_4$ stand for members selected from the group consisting of alkyl, cycloalkyl, aralkyl, and aryl, and $R_3$ and $R_4$ together stand for a heterocyclic radical, and (3) 75–99% by weight of a monomer selected from the group consisting of conjugated diolefins, acrylic acid esters, methacrylic acid esters, monovinyl aromatic compounds, acrylonitrile, methacrylonitrile, vinyl esters, and halogen-containing monoolefinically unsaturated monomers, said aqueous dispersion containing 2–15% by weight, based on the monomers employed, of a non-ionic emulsifying agent.

2. The storage-stable aqueous dispersion of claim 1 wherein said monomer (2) has the formula:

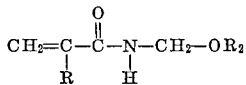

in which R is selected from the group consisting of hydrogen and —CH$_3$, and $R_2$ is selected from the group consisting of alkyl and cycloalkyl.

3. The storage-stable aqueous dispersion of claim 1 wherein the copolymer contains as monomer (1) a monomer selected from the group consisting of alpha,beta-olefinically unsaturated monocarboxylic acids, monoesters of alpha,beta-olefinically unsaturated monocarboxylic acids with aliphatic polyhydroxy compounds, monoethers of monoolefinically unsaturated monohydrophilic alcohols with the aforementioned polyhydroxy compounds, alpha, beta-olefinically unsaturated carboxylic acid amides, olefinically unsaturated sulfonic acids, polyglycol ether esters of alpha,beta-olefinically unsaturated carboxylic acids, and polyglycol ethers of monoolefinically unsaturated alcohols.

4. The storage-stable aqueous dispersion of claim 1 wherein the dispersion has been adjusted to a pH-value of 6.5 to 9.

5. A process for the production of a storage-stable latex of a copolymer of (1) 0.5–10% by weight of a monoethylenically unsaturated monomer having a hydrophilic group selected from the group consisting of sarboxylic, hydroxy, amide, sulfonic acid, and polyglycol ether groups, (2) 0.5–15% by weight of a monomer of the formula:

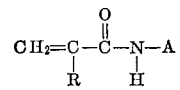

in which R stands for a member selected from the group consisting of hydrogen and methyl, and A stands for a radical having one of the formulae selected from the group consisting of:

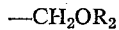
and

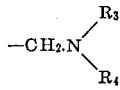

wherein $R_2$ stands for a member selected from the group consisting of alkyl and cycloalkyl; and $R_3$ and $R_4$ stand for members selected from the group consisting of alkyl, cycloalkyl, aralkyl, and aryl, and $R_3$ and $R_4$ together stand for a heterocyclic radical, and (3) 75–99% by weight of a monomer selected from the group consisting of conjugated diolefins, acrylic acid esters, methacrylic acid esters, monovinyl aromatic compounds, acrylonitrile, methacrylonitrile, vinyl esters, and halogen-containing monoolefinically unsaturated monomers, said latex containing 2–15% by weight, based on the monomers employed, of a non-ionic emulsifying agent, in which process the aforesaid monomers are copolymerized in the stated amounts in aqueous dispersion at a pH value below 7 and at a temperature below 60° C. using said non-ionic emulsifying agent, and thereafter the pH value of the latex obtained is adjusted to about 6.5–9.

6. The process of claim 5 wherein, as olefinically unsaturated monomers with at least one hydrophilic group, monomers are used which contain substituents that are converted into hydrophilic groups by saponification, and the dispersion obtained after copolymerization is subjected to conditions under which said substituents are saponified.

7. The process of claim 5 wherein said monoethylenically unsaturated monomer having a hydrophilic group is acrylic acid.

8. The process of claim 5 wherein said monomer containing self-cross-linking groups is the N-methylmethylol ether of methacrylic amide.

9. The process of claim 5 wherein the monomer (3) is butyl acrylate.

10. The process of claim 5 wherein the monomer (3) is acrylonitrile.

11. The process of claim 5 wherein the monomer (3) is butadiene.

12. A process for treating textiles which comprises contacting said textiles with the aqeuous dispersion of claim 1 and thermally cross-linking the film thus obtained on the textiles by subjecting it to temperatures of about 80–200° C.

13. A process for treating textiles which comprises contacting said textiles with the aqueous dispersion of claim 1 and cross-linking the film thus obtained by acidification thereof so as to lower the pH-value to about 2–5.

14. A process of treating textiles which comprises contacting said textiles with the aqueous dispersion of claim 1 and then cross-linking the film thus obtained by heating it to temperatures of about 80–200° C. in the presence of a small amount of an acidic compound so as to lower the pH-value thereof to about 2–5.

15. A cross-linked copolymer obtained by subjecting the copolymer latex of claim 1 to temperatures of about 80–200° C. in the presence of a small amount of an acidic compound so as to lower the pH thereof to about 2–5.

References Cited by the Examiner

UNITED STATES PATENTS

| 2,595,907 | 5/1952 | Thomas | 260—85.5 |
| 2,643,958 | 6/1953 | Kleiner et al. | 260—89.7 |
| 2,683,698 | 7/1954 | Bates | 260—29.6 |
| 2,726,230 | 12/1955 | Carlson | 260—41 |
| 2,828,222 | 3/1958 | Kine et al. | 260—29.6 |
| 2,879,255 | 3/1959 | Coover | 260—89.7 |
| 2,984,588 | 5/1961 | Graulich et al. | 260—29.6 |
| 3,003,987 | 10/1961 | Hager et al. | 260—29.6 |
| 3,007,887 | 11/1961 | Essig | 260—29.6 |
| 3,033,811 | 5/1962 | Brown et al. | 260—29.6 |

OTHER REFERENCES

Schildknecht: "Vinyl and Related Polymers," pp. 316 and 317.

MURRAY TILLMAN, *Primary Examiner.*

D. ARNOLD, LEON J. BERCOVITZ, *Examiners.*